June 14, 1927.
P. SORENSEN
CUT-OUT
1,631,988
Filed July 11, 1923
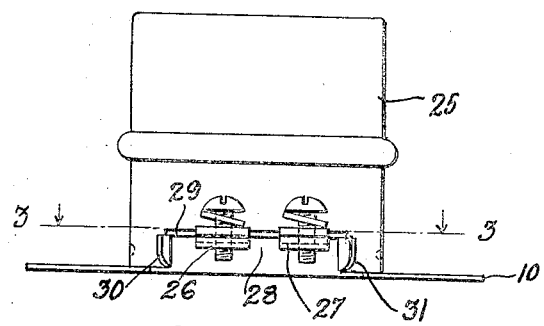
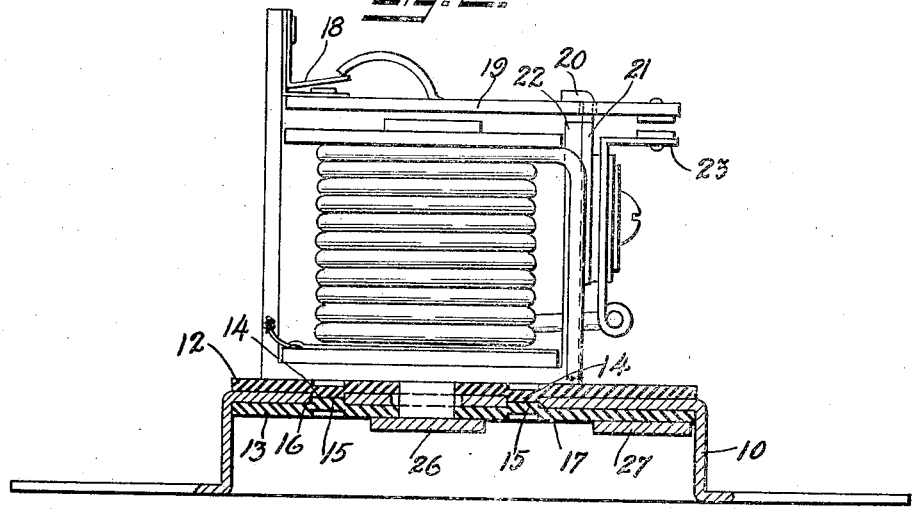
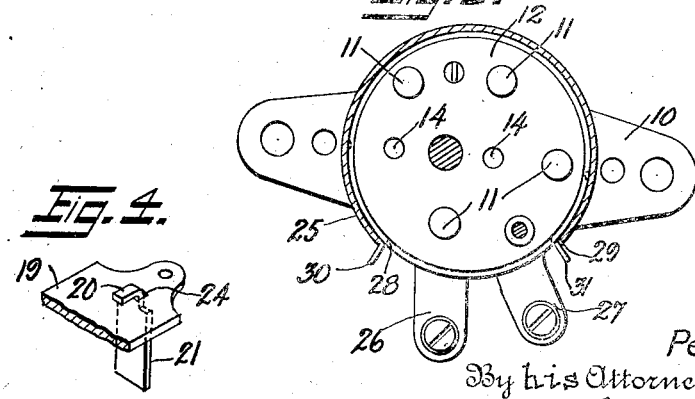
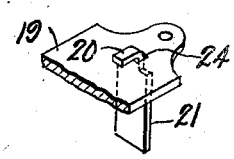
Inventor
Peter Sorensen.
By his Attorney
Lewis J. Doolittle Patented June 14, 1927.

1,631,988

UNITED STATES PATENT OFFICE.

PETER SORENSEN, OF BROOKLYN, NEW YORK.

CUT-OUT.

Application filed July 11, 1923. Serial No. 650,857.

The object of this invention is to provide a device which is adapted to be used in connection with the charging of storage batteries, etc., which is arranged to cut out the charging current when the voltage falls below a predetermined point and to maintain the flow of current during variations of voltage, due to changes of speed of the generator, etc., as when used in connection with an automobile storage battery charged from a generator driven by the gas engine, which, as is well known, is run at varying speeds.

The device embodying my invention is of the vibrating type, in which an electro-magnet influenced by shunt and series coils operates a voltage regulating armature and a generator output regulating armature, the storage battery circuit being only closed when the generator circuit is normally brought into operation.

The electrical arrangement for operating the device forms no part of the present invention, which is directed to certain features of construction of the device which will be more fully described and pointed out hereinafter.

One of the objects of the invention is to provide a removable casing or cover for the cut out device and means associated therewith for preventing accidental short-circuiting in manipulating the cover.

Another object of the invention is to provide a more positive spring action on the generator output regulating armature.

Further objects of the invention are to provide practical features of construction which simplify the making of the parts and assembling of the same, materially reducing the cost of manufacture.

In the drawings, Fig. 1 is a front view of a device of the class described illustrating an embodiment of my invention. This view shows the cover or casing in place and the short-circuiting prevention means associated therewith.

Fig. 2 is a similar view to Fig. 1, partly in section and with the cover removed.

Fig. 3 is a top plan view, taken on the line 3—3 of Fig. 1.

Fig. 4 is a perspective view of the stop means of the generator output regulating armature.

To a base 10 having a flange, preferably constructed of sheet metal, are fastened insulating disks 12 and 13, by means of rivets 11. To facilitate assembling and to insure proper alinement of these parts, the insulating disks 12 and 13 are provided on their inner surfaces with projections 14 and 15, respectively, each fitting half way into holes 16 and 17 in the base 10. The projections 14 and 15 are integral with the disks 12 and 13, respectively, and are formed with the same punching operation employed in the forming of the disks.

This construction and arrangement saves a great amount of time in assembling and, as it insures the parts always being placed together in the correct relation, no particular care or skill is required of the workman assembling the device.

A short bent up spring 18 is employed to maintain the generator output regulating armature 19 in normal position against a bent over portion 20 of a stop member 21, fastened to a bracket 22. This short, stiff spring insures a positive action of the generator output regulating armature, thereby also preventing premature or accidental contact with the storage battery circuit armature 23 causing a short circuiting of the battery.

It will also be seen that this construction of the stop member 21 allows a simple construction of the dies for forming both the stop member 21 and the opening 24 in the generator regulating armature 19.

A removable cover or casing 25, formed of sheet metal, is suitably secured to the base 10, enclosing the entire mechanism, with the exception of the generator connection terminal 26 and the storage battery connection terminal 27. These contact arms project through a cut out portion 28 in the base 10 and are insulated from the base by means of the insulating disks 12 and 13 and held in place by the rivets 11. A complementary cut out portion 29 in the casing 25 of sufficient depth to avoid short circuiting of the contact arms 26 and 27, allows these contact arms to project so as to be easily accessible.

Projections or shoulders 30 and 31 on the base 10 insure positive protection against accidental short circuiting of the generator and storage battery contact arms in manipulating the casing in placing the same in position or in removing the same, as these projections, 30 and 31, prevent the casing from being positioned in place on the base in any other than the correct position, as shown, and prevent short circuiting by contact of the same with the projecting arms in any position it may be placed on the base, as the lower edge of the base will rest upon the top of these projections 30 and 31 if it is attempted to place the casing in position in any but the correct position on the base.

From the foregoing description it will be seen that a construction and arrangement for a device of this class is provided which is positive in its action, simple in construction and that the cost of manufacture is reduced to a minimum on account of the construction of the parts permitting the use of dies for their manufacture, which dies may be inexpensively made and the parts readily assembled without requiring skilled workmen and a substantial saving of time effected in such assembling.

What I claim is:—

1. In a cut-out, a base member having a downwardly extending flange, a portion of said flange being cut away and the edges of the flange at the cutaway portion being struck outwardly to form shoulders, the base member having a series of apertures, insulating disks having projections integral therewith, said disks being located on top and on the bottom of the base member and the projections on the disks engaging apertures in the base member, connecting terminals located beneath the disk at the bottom of the base member, the terminals, disks and base member being rigidly connected together, an electromagnet member positioned on the top disk, an armature located above the electromagnet, a casing having a cut-out portion corresponding in dimensions to the cutaway portion of the flange, said casing being adapted to be guided into position by the abutment of the shoulders on the flange with shoulders on the casing.

2. In a cut-out, a base member having a downwardly extending flange, a portion of said flange being cut away and the edges of the flange at the cutaway portion being struck outwardly to form shoulders, the base member having a series of apertures, insulating disks having projections integral therewith, said disks being located on top and on the bottom of the base member and the projections on the disks engaging apertures in the base member, connecting terminals located beneath the disk at the bottom of the base member, the terminals, disks and base member being rigidly connected together, an electromagnet member secured on the top disk, said member including an upstanding wall, an armature hinged to the wall by means of a bracket, a spring member having two walls, the walls extending at an acute angle to each other and one wall being connected to the upstanding wall, an upwardly curved portion struck from the armature being engaged by a wall of the spring member for positively holding the armature in released position, and a casing having a cut-out portion and shoulders for abutment with the shoulders on the flange.

Signed at New York, in the county of New York and State of New York, this 26th day of June A. D. 1923.

PETER SORENSEN.